Jan. 28, 1947.   B. STEELE   2,414,984
STARTING GATE
Filed May 26, 1942   2 Sheets-Sheet 1
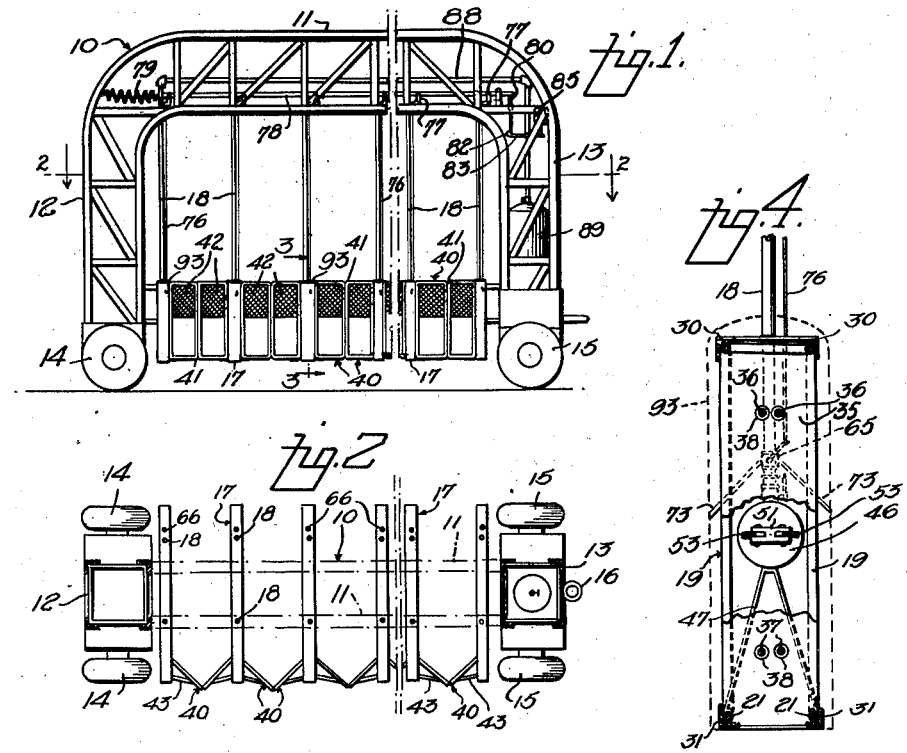
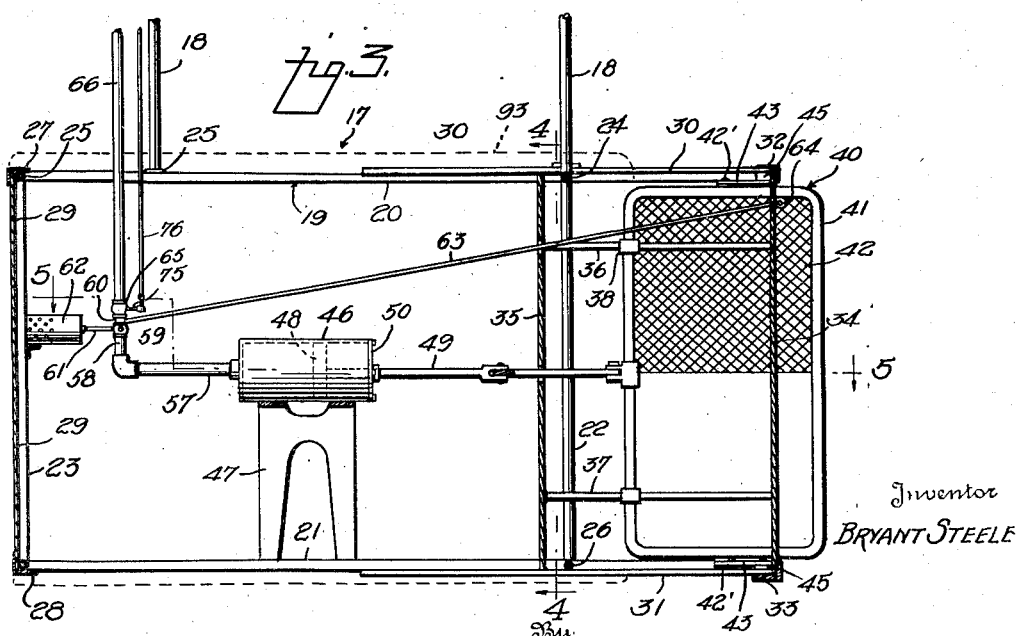
Inventor
BRYANT STEELE

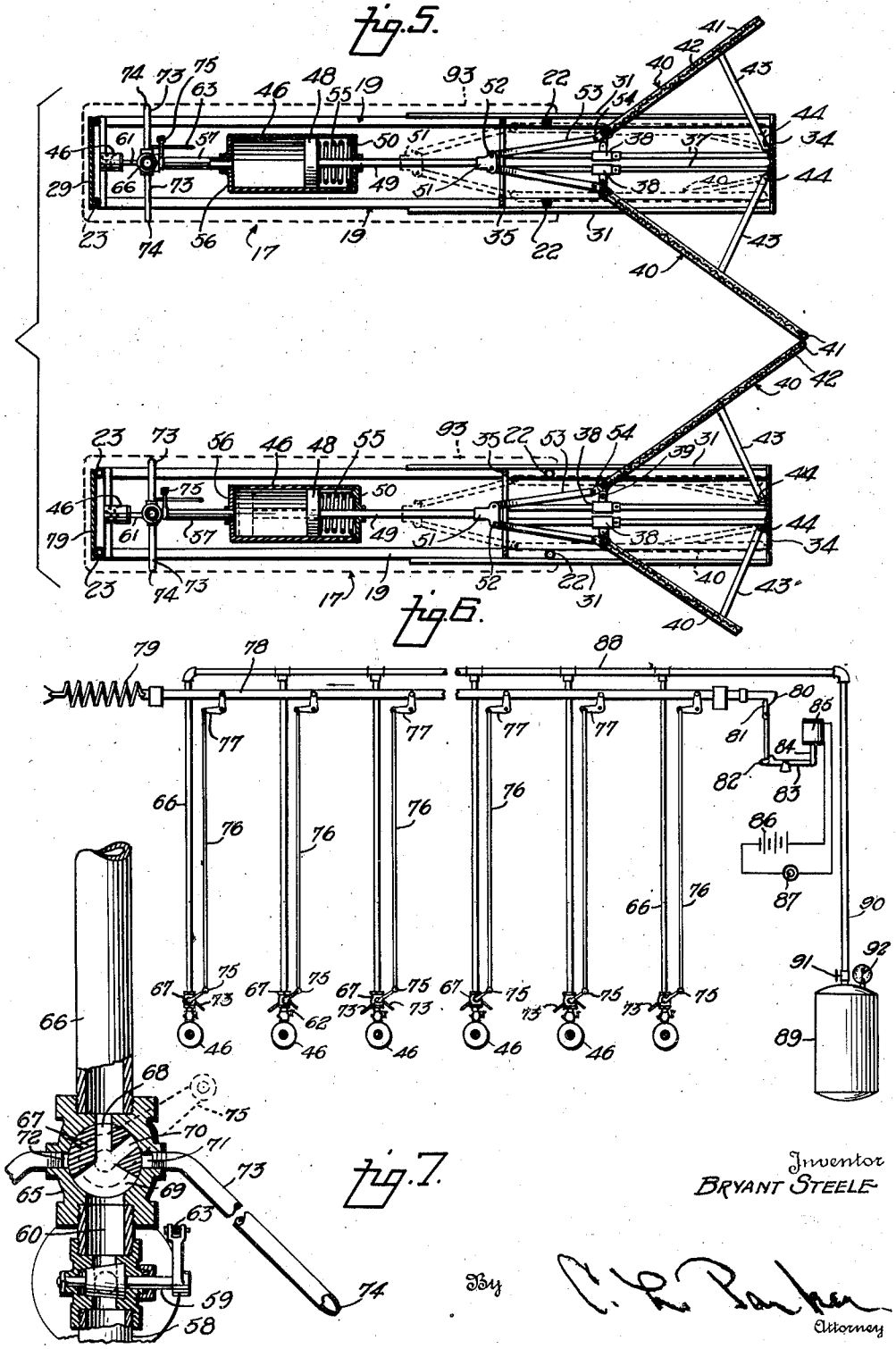

Patented Jan. 28, 1947

2,414,984

UNITED STATES PATENT OFFICE 2,414,984

STARTING GATE

Bryant Steele, Lexington, Ky., assignor of one-fourth to MacClatchie Manufacturing Company of California, Compton, Calif., a corporation of California Application May 26, 1942, Serial No. 444,585

21 Claims. (Cl. 119—15.5)

This invention relates to starting gates for race tracks.

It has been the common practice to provide starting gates for race tracks comprising a supporting frame structure mounted on wheels to move to a position extending across the race track at the starting point and supporting partitions forming stalls for the horses lined up at the starting point. Each stall is provided with a barrier at the head end thereof in the form of a pair of doors or gate elements for each stall having means associated therewith for simultaneously opening the gates upon the sounding of the starting signal. Such a gate is shown in my prior Patent No. 2,193,257, granted March 12, 1940.

Starting gates of such prior types have been highly successful in operation but have been open to a few objections which are sometimes quite serious in their results. For example, the pair of gates at the head end of each stall limit the forward movement of the horses therein until the gate is opened upon the starting signal, and the gates swing on fixed axes to open position. The position which the horse normally occupies in each stall is such that unless he moves straight forward out of the stall, the rump of the horse may swing into contact with the free end of the gate. This sometimes causes injury to the horses, and has been known to cause painful hurts to the feet of jockeys riding the horses. This situation is complicated by the fact that the starting signal usually is a bell, the sound of which startles a horse and causes him to become fractious and upset as he leaves the stall and is a particular cause of a horse's not leaving the stall straight away.

An important object of the present invention is to provide a starting gate structure wherein the free ends of the gates, when in open position, occupy positions further rearwardly than is ordinarily true, thus providing greater clearance for the horse leaving a stall and minimizing the danger of injury to the horse and to the jockey.

A further object is to provide a starting gate construction of this character wherein the pivot means which supports each gate moves longitudinally of each stall partition away from the head end thereof as the gate swings to open position, thus bodily moving the gate to space the free end of the gate further rearwardly than is true with conventional gates.

A further object is to provide a starting gate assembly having novel fluid pressure operated means for controlling the movements of the gates.

A further object is to provide a starting gate assembly wherein fluid pressure operated means is employed for holding the gate in open position, and wherein spring means are employed for moving the gates to open position upon the releasing of the fluid pressure.

A further object is to provide novel means for simultaneously releasing fluid pressure from all of the fluid pressure operated devices at the start of a race, and to direct the escaping fluid pressure against some part of the horse's body to urge him into movement as is commonly done with a starting bell, without startling and upsetting the horses with consequent injurious nervous reactions.

A further object is to provide such an apparatus wherein the hissing noise of the escaping fluid pressure is utilized for urging the horses to leave their stalls to start the race.

A further object is to provide novel means under the control of the starter for opening the gates of any particular stall, where it is necessary to remove a fractious horse from one of the stalls prior to the starting of a race, and to accomplish this without directing the escaping fluid pressure against the horse while at the same time muffling the escaping air so as to avoid urging any of the horses into motion.

Other objects and advantages of the invention will become apparent during the course of the following description.

In the drawings I have shown one embodiment of the invention. In this showing—

Figure 1 is a front elevation of the gate mechanism as a whole, parts being broken away, Figure 2 is a sectional view of the same on line 2—2 of Figure 1, Figure 3 is an enlarged vertical sectional view on line 3—3 of Figure 1, the padding being shown in dotted lines, Figure 4 is a vertical sectional view on line 4—4 of Figure 3, a portion of the transverse vertical plate being broken away, Figure 5 is a section on line 5—5 of Figure 3, Figure 6 is a diagrammatic front elevation showing the control connections for the apparatus, and, Figure 7 is an enlarged fragmentary sectional view of one of the control valve mechanisms for one of the stalls.

Referring to Figures 1 and 2, the numeral 10 designates the supporting frame of the apparatus as a whole comprising an elongated overhead structure 11 and vertical end structures 12 and 13, the former of which carries supporting wheels 14 and the latter of which carries supporting wheels 15 which are connected to the adjacent frame in any manner to permit them to be turned. The end of the frame structure adjacent the vertical structure 13 is provided with a draft connection 16 by means of which the gate assembly may be pulled on to the track and removed therefrom. It will be obvious that the gate assembly is broken away in Figures 1 and 2, and that the assembly as a whole is long enough to extend across the race track in accordance with the usual practice.

Partitions each indicated as a whole by the numeral 17 are arranged in spaced parallel relation within the frame structure 10 transversely thereof and parallel to the race track, each partition being connected to the upper structure 11 by suitable supporting rods 18. Each adjacent pair of partitions forms a stall into which a horse is led prior to the starting of each race, and each stall is provided at its head end with gate elements, to be referred to later, which confine the horses within the stalls until the race starts.

The partitions are substantially identical and only one need be referred to in detail. Each partition comprises a pair of opposite substantially rectangular frames 19, and each of these frames includes upper and lower horizontal pipes 20 and 21 and forward and rear pipes 22 and 23, and the ends of these pipes are suitably connected to form the rectangular shape referred to. Of course, any suitable elements other than pipes may be employed for making the frames, and the frames of each partition are spaced apart in parallel relation as shown in Figure 5. The upper pipes 20 of the frames 19 of each pair are connected to each other by transverse elements 24 and 25 to which the lower ends of the supports 18 may be connected in any suitable manner. The lower pipes 21 are connected to each other as at 26 in the plane of the pipes 22 to assist in rigidly bracing the rectangular pipe frames with respect to each other. At their rear ends, angle iron connecting members 27 and 28 extend transversely between the frames 19 of each partition to rigidly connect them to each other and an end plate 29 may be welded or otherwise secured to the angle members 28.

Each upper pipe member 20 is arranged in an angle iron frame member 30 and each lower frame member 21 is arranged in a similar angle iron frame member 31. These frame members may extend any desired distance along the pipes 20 and 21 and extend substantially beyond the limits of the frames 19 to the head end of the partition as shown in Figure 3. The ends of the angle iron frame members 30 which thus project beyond the head ends of the frames 19 are connected by a transverse angle iron member 32, and the projecting ends of the frame members 31 are similarly connected by transverse angle iron frame members 33. An end plate 34 closes the space between the frame members 32 and 33 as shown in Figures 3 and 5.

A transverse vertical plate 35 is arranged within each partition slightly rearwardly of the vertical members 22 thereof, as shown in Figures 3 and 5. Upper and lower pairs of rods 36 and 37 are welded or otherwise secured at one end to the plate 35 and at the other end to the plate 34 to form guide elements for sleeves 38. Each of these sleeves is pivotally connected as at 39 with respect to a gate element indicated as a whole by the numeral 40 and comprising a tubular frame 41 and a screen or other filler 42. It will be apparent in Figure 5 that each pair of rods 36 and 37 carries a sleeve pivotally connected to one of the gates, and accordingly two gates project from each partition with the gates projecting from adjacent sides of adjacent partitions forming a closure for the stall between such partitions. Of course, the partitions at the ends of the apparatus will be provided with only a single gate element projecting, when in closed position, in an angular direction toward the next adjacent partition.

The top and bottom of each gate frame 41 are pivotally connected as at 42' to one end of a link 43, and the other end of each of these links is pivotally connected as at 44 to a filler block 45 carried by one of the transverse frame members 32 and 33. It will be apparent, therefore, that the pivots 42' of each gate are adapted to swing in an arc of a circle about the pivots 44 as each gate moves between open and closed positions.

A single actuating device is employed for operating both of the gate elements associated with each partition. A fluid pressure cylinder 46 is arranged within each partition and is supported therein in any suitable manner, for example, by legs 47 (Figure 4) secured at their lower ends by welding or the like to the lower pipes 21. A piston 48 is reciprocable in each cylinder and is connected to a piston rod 49 projecting through the end 50 of the cylinder toward the head end of the partition. The piston rod 49 is provided with a head 51 pivoted as at 52 to one end of each of a pair of links 53 and these links are respectively pivotally connected as at 54 to the rear edges of the gates 40. It will be apparent that movement of each piston 48 therefore moves the rear end of each gate longitudinally with respect to the partition with which it is associated, and during such movement each gate will swing bodily due to its connection with the links 43. A spring 55 is arranged in each cylinder 46 and urges the piston 48 in a direction to open the associated gates.

The opposite end of each cylinder 46 is provided with a head 56 through which a pipe 57 is connected to the interior of the cylinder. This pipe turns upwardly as at 58 (Figures 3 and 7), and is provided with a manually operable three-way valve 59 normally arranged in a position affording communication between the pipe section 58 and a pipe section 60 and adapted to be turned to a position connecting the pipe section 58 to a fluid escape pipe 61 leading into a muffler 62. The valve 59 is operable by a rod 63 (Figure 3) extending toward the forward end of the partition and through the plate 34, and the rod 63 terminates in a finger piece 64 operable by the starter so that he can release air from any of the cylinders 46 if it becomes necessary to release a horse in one of the stalls prior to the starting of the race. The muffler 62 is for the purpose of muffling the sound of the escaping air to avoid startling any of the horses.

The pipe section 60 is connected to a valve casing 65 the upper end of which is connected to a pipe 66 leading to a source of fluid pressure in a manner to be described. A valve 67 is provided with a port 68 communicating when in vertical position with the pipe 66 as shown in Figure 7. Opposite the port 68 is a flared port 69 which is always in communication with the pipe section 60. A third port 70 communicates with the ports 68 and 69 and is in diametrical alinement with a portion of the port 69. The valve casing is provided at diametrically opposite points with ports 71 and 72 into each of which is tapped a pipe 73 (Figures 4, 5 and 7) and these pipes are bent to direct air, which escapes therethrough in a manner to be described, so that the air strikes against some portion of the horse in each adjacent stall, for example, against the hock of each horse's leg. The free end of each pipe 73 may be slightly restricted as at 74 to direct a thin stream of air at a relatively high speed so that the escaping air strikes the horse under appreciable pressure and with a hissing sound.

Each valve 67 is operable by a crank 75 to be turned between the position shown in Figure 7 and a second position in which air escapes from the associated cylinder 46 through the ports 69 and 70 and ports 72 and 71 respectively, and thus through the pipes 73. A rod 76 (Figures 3 and 6) is connected at its lower end to each of the valve cranks 75. Each valve rod 76 and the associated air supply pipe 66 extend from the associated partition centrally of the width thereof and adjacent one of the supporting pipes 18.

The upper end of each rod 76 is connected to one arm of a bell crank lever 77 and the other arm of each of these levers is connected to an operating bar 78 normally urged toward the left in Figure 6 by a spring 79. The other end of the bar 78 is provided with a detent 80 engageable with one end of a lever 81 and the opposite end of this lever is engaged by a detent 82 formed at one end of a lever 83. The other end of the latter lever is connected to the armature 84 of a solenoid 85 connected in circuit with a battery 86 and a push button 87. This push button may be suitably carried by a flexible cable (not shown) and is handled by the starter as will become apparent.

The upper end of each pressure supply pipe 66 is connected to a header pipe 88 to which pressure is supplied from a tank 89 through a pipe 90 controlled by a manual valve 91, the tank 89 being preferably provided with a pressure gage 92. It will be apparent that the bar 78 and its spring 79, the pivots of the bell crank levers 77, the release mechanism for the bar 78 and the pipes 89 and 90 are suitably carried by the main supporting frame 10. The tank 89 may be arranged within the end structure 13 as shown in Figure 1.

All of the partitions 17 have been shown in the nature of skeleton frames, but it will be apparent that each partition is covered in the usual manner by suitable padding shown in dotted lines in Figures 3, 4 and 5 and indicated by the numeral 93. This padding will cover the entire side of each partition from the rear end of each partition up to and including the vertical pipes 22 as shown in Figure 5. Moreover, the padding may extend over the top of each partition as indicated in dotted lines in Figures 3 and 4.

The operation of the apparatus is as follows:

The tank 89 is charged with fluid under pressure, preferably air, to the desired pressure as indicated by the gate 92. The apparatus is then pulled onto the track at the starting point and when the starting time for the next race approaches, an attendant will open the valve 91 and admit air under pressure through pipes 90 and 88 and the individual pipes 66 into the cylinders 46, the valves 67 all being arranged in the position shown in Figure 7 and the valve 59 being arranged in a charging position, closing the pipe 61 (Figure 3).

Air under pressure entering the cylinders 46 will move the pistons 48 from the dotted line positions shown in Figure 5 to the solid line positions. This operation takes place against the tension of the springs 55 and moves all of the gates to their closed positions. The horses may now enter their respective stalls ready for the starting of the race. If, before starting the race, one of the horses becomes unruly, the starter may pull the rods 63 of the partitions on opposite sides of said horse whereupon he can be brought out of the stall through the forward end thereof. The pulling of any rod 63 permits air to escape from the associated cylinder 46 through valve 59 and pipe 61 into the muffler 62, the escaping air making no appreciable sound.

Assuming that the race is to be started, the starter will press the button 87 to energize the solenoid 85 and thus swing the lever 83 to release the lever 81 and consequently the detent 80. The spring 79 (Figure 6) will then move the control bar 78 to the left to move all of the rods 76 downwardly and thus turn each valve 67 to a position in which this port 68 will be cut off from communication with the associated pipe 66 and to connect the associated cylinder 46 to the pipes 73 through the valve ports 69 and 70 and the respective ports 72 and 71.

The releasing of the air pressure from each cylinder 46 permits the spring 55 thereof to move the head 51 (Figure 5) toward the left to pull in the same direction on the rear edges of the two associated gates, such edges of the gates being guided for movement by the sleeves 38. When such movement takes place, the gates will move bodily and each will be guided not only by the sleeves 38 but also by the links 43, the pivots 42 thereof turning about the pivots 44 as centers. Under such conditions, therefore, the gates not only will move to open position but will move bodily back from the head end of each stall to occupy positions inwardly of the plates 34. It will therefore be apparent that the gates, when opened, will occupy positions some ten to fourteen inches rearwardly of the positions normally occupied by gates swinging on fixed axes. Any horse leaving his stall without moving straight ahead will be much less apt to strike the gate than is true with present constructions. As a matter of fact, horses ordinarily strike their rumps against the extremities of the gates and with the present construction the difference in the position of each gate with relation to conventional arrangements is such that a horse will rarely ever come in contact with a gate when leaving his stall.

As previously stated, horse races ordinarily are started by opening the starting gates coincidentally with the sounding of a starting bell. The sound of such bell unduly startles high strung race horses and tends to cause them nervous upsets which sometimes seriously affect them. The startling of a horse by previous methods is obvious from the manner in which they leave the starting stalls, the horses instantaneously dropping into a semi-crouch upon the sounding of the starting bell and wildly pawing the ground in an effort to get underway and leave the source of the startling sound. Race horses frequently leave paw marks up to three feet long where their forefeet slide over the ground in an effort to leave the stall as rapidly as possible.

No bell need be employed with the present construction and the startling effects thereof are substantially eliminated. It is desirable to urge a horse to start quickly but not to startle him. With the present construction the air released from each cylinder 46 passes from the ends of the pipes 73 to strike against some portion of the horse, preferably at his hocks, and the pressure of this air and the hissing sound made by its escape urge the horse into a quick start in which he does not crouch as much as has been previously true and in which the marks of his forefeet do not indicate that he wildly paws the ground in an effort to get under way. The horse thus expends less physical effort to start and does so with less nervous strain, but he starts approximately as rapidly due to the fact that his efforts are more efficient than has been true with previous forms of starting gates.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A starting gate assembly comprising a pair of spaced partitions defining a stall therebetween, a gate element carried by each partition and movable to closed position with one end adjacent the corresponding end of the other gate element, each of said gate elements being adapted when in closed position to extend at an angle across the head end of the stall whereby said gates converge in the direction of such end of the stall, and means for supporting said gates with respect to said partitions to move to open position and to simultaneously move bodily endwise with respect to the partitions.

2. A starting gate assembly comprising a pair of spaced partitions defining a stall therebetween, a gate element carried by each partition and movable to closed position with one end adjacent the corresponding end of the other gate element, each of said gate elements being adapted when in closed position to extend at an angle across the head end of the stall whereby said gates converge in the direction of such end of the stall, means for supporting said gates with respect to said partitions to move to open position and to simultaneously move bodily endwise with respect to the partitions, and means for effecting simultaneous movement of said gates between open and closed positions.

3. A starting gate assembly comprising a plurality of pairs of spaced partitions, each said pair of spaced partitions defining a stall therebetween, a gate element carried by each partition and movable to closed position with one end adjacent the corresponding end of the other gate element, each of said gate elements being adapted when in closed position to extend at an angle across the head end of the stall whereby said gates converge in the direction of such end of the stall, means for supporting said gates with respect to said partitions to move to open position and to simultaneously move bodily endwise with respect to the partitions, fluid pressure operated means for moving said gate elements to closed position, and means biasing said gates to open position whereby they will be moved to such position upon the releasing of pressure from said fluid pressure operated means.

4. A starting gate assembly comprising a pair of spaced partitions defining a stall therebetween, a gate element carried by each partition and movable to closed position with one end adjacent the corresponding end of the other gate element, means for supporting said gates with respect to said partitions to move to open position and to simultaneously move bodily endwise with respect to the partitions, fluid pressure operated means for moving said gate elements to closed position, pressure release means for directing pressure fluid from said last named means into the stall in a direction to impinge against a horse therein when the fluid pressure is released, and means for moving said gate elements to open position upon the releasing of the fluid pressure.

5. A starting gate assembly comprising a pair of spaced partitions defining a stall therebetween, a gate element carried by each partition and movable to closed position with one end adjacent the corresponding end of the other gate element, means for supporting said gates with respect to said partitions to move to open position and to simultaneously move bodily endwise with respect to the partitions, fluid pressure operated means for moving said gate elements to closed position, pressure release means for directing pressure fluid from said last named means into the stall in a direction to impinge against a horse therein when the fluid pressure is released, and a spring biasing each gate element to open position to move it to such position upon the releasing of the fluid pressure.

6. A starting gate assembly comprising a pair of partitions forming a stall therebetween having a head end, a gate element adjacent the head end of each partition, each gate element being adapted to assume an open position approximately parallel to its partition and movable to a closed position diverging from its partition to a point wherein one end of such gate element is arranged in proximity to the corresponding end of the other gate element, operating means pivotally connected to the other end of each gate, each gate having mechanical connection with its associated partition whereby, upon movement of said operating means, each gate will swing from its closed to its open position and simultaneously move bodily in a direction away from the head end of the stall, and means for actuating said operating means.

7. A starting gate assembly comprising a plurality of pairs of spaced partitions, each said pair of partitions forming a stall therebetween having a head end, a gate element adjacent the head end of each partition, each gate element being adapted to assume an open position approximately parallel to its partition and movable to a closed position diverging from its partition to a point wherein one end of such gate element is arranged in proximity to the corresponding end of the other gate element, operating means pivotally connected to the other end of each gate, each gate having mechanical connection with its associated partition whereby, upon movement of said operating means, each gate will swing from its closed to its open position and simultaneously move bodily in a direction away from the head end of the stall, and fluid pressure operated means for controlling said operating means.

8. A starting gate assembly comprising a pair of partitions forming a stall therebetween having a head end, a gate element adjacent the head end of each partition, each gate element being adapted to assume an open position approximately parallel to its partition and movable to a closed position diverging from its partition to a point wherein one end of such gate element is arranged in proximity to the corresponding end of the other gate element, operating means pivotally connected to the other end of each gate, each gate having mechanical connection with its associated partition whereby, upon movement of said operating means, each gate will swing from its closed to its open position and simultaneously move bodily in a direction away from the head end of the stall, fluid pressure operated means for controlling the movement of said operating means and including a fluid pressure chamber and a valve controlled device for admitting fluid into said chamber, means biasing said gates to open position, and means for releasing fluid pressure from said chamber whereby the gate elements will be moved to open position, said last named means being constructed and arranged to direct the released pressure fluid against an animal in the stall.

9. A starting gate assembly comprising a plurality of pairs of spaced partitions, each said pair of partitions forming a stall therebetween having a head end, a gate element adjacent the head end of each partition, each gate element being adapted to assume an open position approximately parallel to its partition and movable to a closed position diverging from its partition to a point wherein one end of such gate element is arranged in proximity to the corresponding end of the other gate element, operating means pivotally connected to the other end of each gate, each gate having mechanical connection with its associated partition whereby, upon movement of said operating means, each gate will swing from its closed to its open position and simultaneously move bodily in a direction away from the head end of the stall, a fluid pressure operated device having a movable member connected to said operating means, means for admitting fluid under pressure into one end of said device to close said gate elements, valve controlled means for releasing fluid pressure from said device, and spring means for moving said gate elements to open position upon the releasing of pressure fluid from said device.

10. Apparatus constructed in accordance with claim 9 wherein the means for releasing fluid pressure from said device comprises a pipe for releasing the pressure fluid at a point and in a direction to impinge the escaping fluid against an animal in the stall.

11. A starting gate assembly comprising a plurality of pairs of spaced partitions, each said pair of partitions defining a stall therebetween having a head end, a gate element associated with each partition and diverging therefrom to a position in proximity to the other gate element when in closed position, means carried by each partition for guiding the other end of the associated gate element for movement longitudinally with respect to such partition, means connecting each gate element to its associated partition to cause it to partake of bodily movement longitudinally away from the head end of the stall to a position in proximity and parallel to the associated partition to assume an open position, and means for effecting simultaneous movement of each gate element between its open and closed positions.

12. Apparatus constructed in accordance with claim 11 wherein the means for effecting movement of each gate element comprises fluid pressure operated means for moving the last named end of each gate longitudinally of the associated partition to move the gate between open and closed positions.

13. Apparatus constructed in accordance with claim 11 wherein the means for effecting movement of each gate element comprises fluid pressure operated means for moving each gate between open and closed positions, and spring means urging each gate to open position to move it to such position upon the releasing of fluid from said fluid pressure operated means.

14. A starting gate assembly comprising a plurality of pairs of spaced partitions, each said pair of partitions defining a stall therebetween having a head end, a gate element associated with each partition and diverging therefrom to a position in proximity to the other gate element when in closed position, means carried by each partition for guiding the other end of the associated gate element for movement longitudinally with respect to such partition, means connecting each gate element to its associated partition to cause it to partake of bodily movement longitudinally away from the head end of the stall to a position in proximity and parallel to the associated partition to assume an open position, fluid pressure operated means for moving each gate to its closed position, means for releasing fluid from said fluid pressure operated means, and a spring for moving each gate to its open position upon the releasing of fluid from said pressure operated means.

15. Apparatus constructed in accordance with claim 14 wherein the means for releasing fluid from said fluid pressure operated means comprises a pipe terminating in a position to direct escaping fluid against the body of an animal in the stall.

16. A starting gate assembly comprising a plurality of parallel partitions spaced to provide a stall between each adjacent pair, each stall having a head end, a gate element carried by each partition and adapted when in closed position to extend at an angle across a portion of each adjacent stall at the head end thereof, a pair of guide rods carried by each partition for each gate, guides mounted on the rods of each pair and pivotally connected to the end of the associated gate remote from the head end of the stalls whereby the latter end of each gate is movable in the plane of its partition, a link pivoted at one end to each gate intermediate the ends thereof and pivoted at the other end to the associated partition whereby, upon longitudinal movement of each pair of said guides away from the head end of the associated stall, the associated gate will be caused to move bodily away from the head end of its stall as it swings toward its associated partition to assume an open position, and means for simultaneously opening all of said gates.

17. A starting gate assembly comprising a plurality of parallel partitions spaced to provide a stall between each adjacent pair, each stall having a head end, a gate element carried by each partition and adapted when in closed position to extend at an angle across each adjacent stall at the head end thereof, a pair of guide rods carried by each partition for each gate, guides mounted on the rods of each pair and pivotally connected to the end of the associated gate remote from the head end of the stalls whereby the latter end of each gate is movable in the plane of its partition, a link pivoted at one end to each gate intermediate the ends thereof and pivoted at the other end to the associated partition whereby, upon longitudinal movement of each pair of said guides away from the head end of the associated stall, the associated gate will be caused to move bodily away from the head end of its stall as it swings toward its associated partition to assume an open position, fluid pressure operated means for moving the gates of each partition to closed position, fluid release means for each fluid pressure operated means, a spring for moving the gates of each partition to open position upon the release of pressure by said pressure release means, and means for simultaneously operating the pressure release means of all of said partitions for the simultaneous opening of all of said gates.

18. Apparatus constructed in accordance with claim 17 wherein each fluid pressure release means comprises a pipe for releasing pressure fluid to the atmosphere at a point and in a direction to impinge the pressure fluid against the body of an animal in the adjacent stall.

19. Apparatus constructed in accordance with claim 17 provided with manually controllable means for permitting escape of pressure fluid from the fluid pressure operated means of each partition independently of said fluid pressure release means.

20. Apparatus constructed in accordance with claim 17 provided with manually controllable means for permitting escape of pressure fluid from the fluid pressure operated means of each partition independently of said fluid pressure release means, and means for muffling the escape of pressure fluid through said independently operable means.

21. A starting gate assembly comprising a pair of spaced partitions defining a stall therebetween having a head end, gate mechanism at the head end of said stall adapted to assume open and closed positions, means for opening said gate mechanism, and means actuated by the opening means and located adjacent the tail end of said stall for projecting fluid under pressure against an animal in the stall substantially simultaneously with the movement of said gate mechanism to open position.

BRYANT STEELE.